United States Patent [19]

Yamaguchi

[11] 4,251,127
[45] Feb. 17, 1981

[54] WIDE-ANGLE DOOR VIEWER

[76] Inventor: Takeyoshi Yamaguchi, 20-24, Tsurumaki 5-chome, Setagaya-ku, Tokyo 154, Japan

[21] Appl. No.: 48,812

[22] Filed: Jun. 15, 1979

[51] Int. Cl.³ .............................................. G02B 7/02
[52] U.S. Cl. .................................... 350/69; 350/410; 350/429; 350/453; 350/319
[58] Field of Search ................... 350/69, 175 E, 187, 350/212, 319

[56] References Cited

U.S. PATENT DOCUMENTS 4,175,824  11/1979  Daley .............................. 350/69 X

FOREIGN PATENT DOCUMENTS 2840600  9/1979  Fed. Rep. of Germany ............ 350/212

Primary Examiner—Paul A. Sacher
Attorney, Agent, or Firm—Burns, Doane, Swecker & Mathis

[57] ABSTRACT

A wide-angle door viewer providing a large wide-angle outdoor view which can be zoomed and is readily perceptible without closely approaching the eyepiece, which comprises an optical lens barrel having relatively large diameter lenses in positions of reverse Galileo system, a mounting barrel for mounting the lens barrel to a door or the like, and a zoom barrel fitted slidably to the mounting barrel and having a relatively larger diameter eyepiece on which the large view is provided for direct but distanced observation.

6 Claims, 3 Drawing Figures

WIDE-ANGLE DOOR VIEWER

This invention relates to door viewers set in doors, walls and the like and, more particularly, to improvements in a door viewer providing a readily perceptible wide-angle outdoor view through the door or the like.

In conventional door viewers of the kind referred to, as disclosed, for example, in French Pat. No. 1,378,602 to Fosset and U.S. Pat. No. 4,116,529 to Yamaguchi, there is adopted a fixed focus system wherein, as shown in FIG. 1, all the lenses of the optical system of a reverse Galileo type arrangement are fixed in the same lens barrel 1, the objective 2 shown as a wide-angle lens is positioned outside the door D or the like, the eyepiece 3 is positioned inside it, generally a mounting barrel 4 screwed with screw threads on the outer periphery of said lens barrel is fitted from inside the door, and the door D is held in its thickness between respective flanges of the both barrels 1 and 4 so as to fasten and fix the system to the door. Generally, it is preferable that the door viewer of this kind is so small in the diameter as not to be conspicuous when seen from outside. Therefore, the eyepiece 3 is also required to be small in the diameter. Even in the case that a wide-angle lens of a comparatively large diameter is used as the objective to eliminate the dead angle of the outdoor view, the diameter of the hole H to be opened in the door or the like is to be kept comparatively small and, for this purpose, the diameter of convergent light of the optical system is made small, rendering the diameter of the eyepiece to be small, so that the user must approach his eye considerably closer to the eyepiece and it is difficult to discern any visitor with the outdoor view seen through such eyepiece of the small diameter. Further, when the thickness of the door or the like is large, the eyepiece fixed in the same lens barrel as of the objective will be set in a position deep from the inside surface of the door, so that it will be difficult for the user to approach the eye to the eyepiece and it will be impossible to confirm the outdoor view depending on the sight of the user. The present invention has been suggested to eliminate such defects of the conventional door viewers.

A primary object of the present invention is, therefore, to provide a door viewer with which the outdoor view can be easily and clearly confirmed without having the eye approached the eyepiece.

Another object of the present invention is to provide a door viewer with which the image shown on the eyepiece can be freely magnified or contracted even after it is mounted to the door or the like.

Other objects and advantages of the present invention shall become clear from the following disclosures detailed with reference to preferred embodiments of the present invention shown in accompanying drawings, in which.

Figure 2:
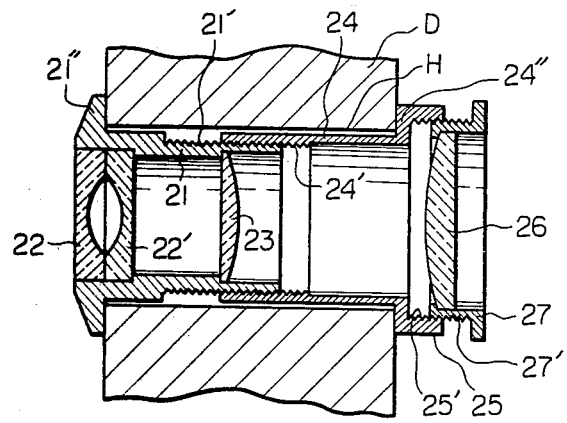
FIG. 2 is a similar vertically sectioned view of an embodiment of the door viewer of the present invention.

Referring to FIG. 2, a lens barrel 21 of a cylindrical shape and having, for example, male screw threads 21' on the outer periphery on one end side is provided with a wide-angle objective comprising a pair of concave lenses 22 and 22' which are symmetrical in this case at the other end which having an outer peripheral flange 21", and an intermediate eyepiece comprising a convex lens 23 at the said one end as, for example, bonded and fixed to respective inner stepped parts of the barrel 21, which lenses being arranged in a reverse Galileo type. A barrel 24 of a cylindrical shape to mount this lens barrel 21 within a hole H in a door D has female screw threads 24' to mesh with the male screw threads 21' on the outer periphery of the lens barrel 21 coaxially with it on the inner bore near one end and is provided with a flange 24" for holding the door D as opposed to the flange 21" of the lens barrel 21 on the outer periphery at the other end. The flange 24" is provided with an enlarged barrel portion 25 extending in the lengthwise direction of the barrel 24 and is provided with female screw threads 25' on the inner periphery. A zoom barrel 27 of a cylindrical shape and holding a direct visual eyepiece comprising a convex lens 26 and having on the outer periphery male screw threads 27' to mesh with the female screw threads 25' of the enlarged portion 25 of the mounting barrel 24 is fitted to the enlarged barrel portion 25. Therefore, the mounting barrel 24 fixed inside the door while mounting to the door the lens barrel 21 with the objectives 22 and 22' and eyepiece 23 of the optical system as held within the hold H of the door D in the illustrated position is provided with the zoom barrel 27 which has the lens 26 acting as a zoom lens that can be moved to extend and contract with respect to the lens barrel 21 when the barrel 27 is rotated by the user.

In such case, a convex lens eyepiece system comprising the intermediate eyepiece 23 and direct visual eyepiece 26 will be so arranged as to have the objectives 22 and 22' at the combined focus of these two lenses 23 and 26. At the same time, the direct visual eyepiece 26 further magnifies the convergent light from the objectives 22 and 22' magnified by the intermediate lens 23, so as to vary the magnification with the movement in the direction of the optical axis of the optical system with the rotation of the zoom barrel 27. The larger the diameter of the direct visual eyepiece 26, the easier the outdoor view shown on the lens 26 will make the user's observation from the position separated from the lens 26 and the perception of the visitor outside the door. In order to make it possible to establish the focus relation between the eyepiece system and the objective system within the range of various thicknesses of general doors, on one hand, and to use the direct visual eyepiece of a large diameter, on the other hand, it is preferable that the intermediate eyepiece convex lens 23 is fixed to a position relatively closer to the objective convex lenses 22 and 22' and is made to have the same diameter as of the objectives and the bore diameter of the lens barrel 21 or mounting barrel 24 between the intermediate eyepiece 23 and the direct visual eyepiece 26 is at least the same as or larger than that of the objective or intermediate eyepiece, so that the wide-angle field of vision through the wide-angle objective can be shown on the direct visual eyepiece 26 without being reduced.

It is preferable in general that the angle of the wide-angle field of vision is made 180 degrees. In the case of the embodiment of FIG. 2, with such formation as illustrated of the four lenses 22, 22', 23 and 26 respectively of a diameter of about 20 mm., an outdoor view of a wide-angle of about 170 degrees is obtained and can be clearly discerned by the user of an ordinary sight from a position about 16 inches separate from the direct visual eyepiece 26. With a moving distance of usually about 3 to 10 mm. of the eyepiece 26 of the zoom barrel 27, a sufficient zoom effect can be obtained.

In the embodiment of FIG. 2, the zoom barrel 27 is provided only with one convex lens 26 so that the length of the barrel in the axial direction will be made as small as possible and the height projecting on the inside surface of the door or the like is also made smaller. For this purpose, also, the barrel 27 is made slidable along the inside surface of the enlarged portion 25 of the mounting barrel 24.

Figure 3:
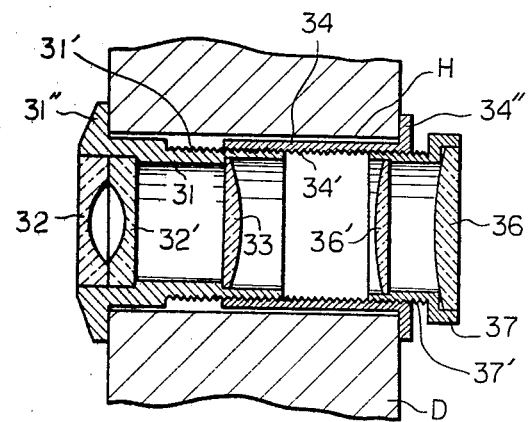
FIG. 3 is a similar vertically sectioned view of another embodiment of the present invention.

On the other hand, in the case of combining another convex lens with the direct visual eyepiece for the purpose of improving the clearness of the image provided on the direct visual eyepiece, as shown in a second embodiment of FIG. 3, the zoom barrel having such zoom lens system may be made to slide on the bore of the mounting barrel. That is, an optical system lens barrel 31 holding objective concave lenses 32 and 32' and a first intermediate eyepiece 33 of a convex lens has male screw threads 31' on the outer periphery on the side having the convex lens 33 and is provided with a flange 31" on the peripheral surface on the side of the objective lenses. A barrel 34 for mounting this lens barrel 31 within the hole H in the door D or the like has female screw threads 34' to mesh with the male screw threads 31' of the lens barrel 31 substantially over the entire length of its inner periphery. A zoom barrle 37, which holding a zoom lens or direct visual eyepiece 36 at one end and having on the outer periphery male screw threads 37' to mesh with the female screw threads 34' of the mounting barrel 34, further holds a second intermediate eyepiece 36' on the inner periphery at the other end, and this zoom barrel is screwed into the inner bore of the mounting barrel 34. Therefore, a wide-angle outdoor view incident through the wide-angle objective system and magnified by the first intermediate eyepiece 33 will be further magnified by the combination of the second intermediate eyepiece 36' and direct visual eyepiece 36 forming a zoom lens system and will be clearly provided as a readily perceptible view. In such case, it is preferable that the diameters of the second intermediate eyepiece 36' is made at least the same as that of the first intermediate eyepiece 33 and the bore diameter of the zoom barrel 37 is made the same as that of the end portion holding the lens 33 of the lens barrel 31, or the diameter of the lens 36' and zoom barrel 37 at its inner bore are made larger than the bore diameter of the lens barrel 31. Even if the axial length of the zoom barrel 37 having the two convex lenses is increased to be larger than in the case of the embodiment of FIG. 2 by such arrangement, the screw sliding relation of the zoom barrel 37 with the mounting barrel 34 can be established, as different from that in FIG. 2, at abutting portion of the mounting barrel 34 with its part embedded within the door or the like and, therefore, the zoom barrel 37 will not unnecessarily project out of the inside surface of the door or the like. Further, in this case, another intermediate eyepiece of a convex lens of the same diameter as of the objective 32' may be also provided just behind the objective 32'.

Figure 1:
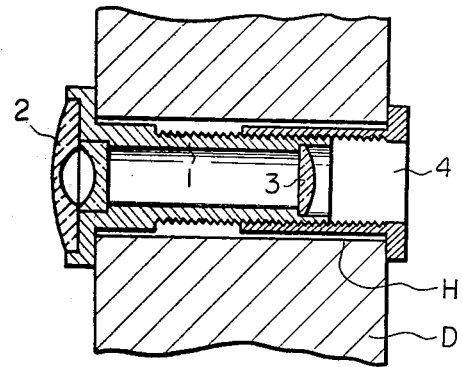
FIG. 1 is a vertically sectioned view of a conventional door viewer as mounted to a door.

In either of the embodiments in FIGS. 2 and 3, such wide-angle lens 2 of a large diameter having a convex surface of a large radius of curvature on one surface and a concave surface of a relatively much small radius of curvature on the other surface as shown, for example, in FIG. 1 may be further added outside the objective concave lens 22 or 32, or as combined with a concave lens having a concave surface of the same diameter as the concave surface of said wide-angle lens 2 on one surface and a flat surface on the other surface as in FIG. 1, so as to obtain a wide-angle outdoor view of about 180 degrees. On the contrary, in the case that the field of vision of, for example, about 130 degrees is sufficient, only the concave lens 22 of FIG. 2 or the concave lens 32 of FIG. 3 may be used and the other concave lens 22' or 32' may be omitted.

Further, in the case of either embodiment of FIG. 2 or 3, the bore diameter of the lens barrel or mounting barrel is made substantially the same as the diameter of the wide-angle objective, the outside diameter of the mounting barrel enclosing the optical system is made larger than in the case of the conventional example as in FIG. 1 and, therefore, the diameter of the hole H made through the door or the like must be made about 1 inch. However, this is a desirable form suggested to most economically arrange the elements of the entire optical system within a thickness range of usually about 1.5 to 2 inches of the door, as referred to in the foregoing, and to provide the clear outdoor view without necessitating the user's eye to be closely approached to the eyepiece or specifically the zoom lens. For example, as in the conventional example of FIG. 1, the present invention may even be applied to a door viewer made small in the outside diameter of the lens and mounting barrels and a zoom lens of a larger diameter can be provided in the mounting barrel 4. However, in such case, the distance between the eyepiece 3 and the zoom lens must be made large and a plurality of zoom lenses must be used to reduce this distance. Therefore, it will be understood that the embodiments of FIGS. 2 and 3 are desirable to most economically and effectively attain the respective objects of the present invention.

Further, the manner in which the respective lenses are held in the respective barrels may not be the one using such stepped part as illustrated, but may be either way of bonding them to the positions or fitting them by means of a sleeve or spring ring. The slidable abutting relations respectively between the lens and mounting barrels and between the mounting and zoom barrels are attained by the screw threads in the illustrated embodiments but may be made by such other proper means than the screw threads as, for example, a slidable surfacial fitting between the peripheral surfaces of the barrels including a stopper of fastening means. The slidable abuttment of the inner periphery of the mounting barrel with the outher periphery of the lens barrel may be modified to that of the outer periphery of the mounting barrel with the inner periphery of the lens barrel.

What is claimed is:

1. A wide angle door viewer comprising a lens barrel enclosing therein an optical system including objective and eyepiece lens systems arranged in a reverse Galileo type and having a flange on the peripheral edge at one end holding said objective system, a mounting barrel coaxially slidably jointed at one end with the other end of said lens barrel and having on the peripheral edge at the other end a flange for holding a door or the like in cooperation with said flange of the lens barrel, and a zoom barrel slidably jointed with said mounting barrel in coaxial relation to the lens barrel adjacent said flange of the mounting barrel and holding a zoom lens which receives light beam from the optical system.

2. A door viewer according to claim 1 wherein said mounting barrel has an enlarged barrel portion on the peripheral edge of said flange, and said zoom barrel is slidably jointed with the inner periphery of said enlarged barrel portion.

3. A door viewer according to claim 1 wherein said zoom barrel is slidably jointed with the inner periphery of said mounting barrel.

4. A wide angle door viewer comprising
a reverse Galileo type optical system including a wide-angle objective system of at least two concave lenses and an eyepiece system of at least one convex lens of the same diameter at least as that of said concave lens,
a first cylindrical member enclosing light beam in said optical system and holding respective said lenses on the inner periphery, said first cylindrical member having a first flange on the outer periphery at one end holding said objective lenses and male screw threads on the outer periphery at the other end holding said eyepiece lens,
a second cylindrical member having on the inner periphery female screw threads to mesh with said male screw threads of said first cylindrical member, said second cylindrical member having a second flange on the outer periphery at one end for holding a door or the like in the thickness direction thereof in cooperation with said first flange to mount the first cylindrical member within a hole in the door or the like, and
a zoom cylinder holding on the inner periphery a zoom lens system of at least one convex lens of the same diameter at least as that of said convex lens of the optical system and slidably jointed on the outer periphery with the inner periphery of the second cylindrical member adjacent said second flange, said zoom lens system being movable coaxially with the optical axis of the optical system to position the objective system within the combined focus of said eyepiece and zoom lens system.

5. A door viewer according to claim 4 wherein said lens of said zoom lens system is of a diameter relatively larger than that of said eyepiec eystem lens, said zoom cylinder has male screw threads on the outer periphery and said second cylindrical member has an enlarged cylindrical portion extending in the lengthwise direction of the second cylindrical member on the peripheral edge of said second flange and having on the inner periphery female screw threads to mesh with said male screw threads of the zoom cylinder so that the zoom cylinder will be movable in said lengthwise direction within said enlarged cylindrical portion.

6. A door viewer according to claim 4 wherein said zoom lens system consists of two convex lenses positioned as separated from each other within said zoom cylinder, and said zoon cylinder is provided on the outer periphery with male screw threads to mesh with the female screw threads on the inner periphery of said second cylindrical member so as to be movable along the inner periphery of the second cylindrical member.

* * * * *